March 4, 1958

A. W. BOWMAN 2,825,769

IGNITION SYSTEM

Filed Oct. 5, 1953

INVENTOR.
ALFRED W. BOWMAN
BY
Lippincott & Smith

ATTORNEYS

March 4, 1958

A. W. BOWMAN 2,825,769

IGNITION SYSTEM

Filed Oct. 5, 1953

INVENTOR.
ALFRED W. BOWMAN
BY
*Lippincott & Smith*

ATTORNEYS

March 4, 1958  A. W. BOWMAN  2,825,769
IGNITION SYSTEM
Filed Oct. 5, 1953  3 Sheets-Sheet 3

INVENTOR.
ALFRED W. BOWMAN
BY
*Lippincott Smith*
ATTORNEYS

United States Patent Office 2,825,769
Patented Mar. 4, 1958

2,825,769

IGNITION SYSTEM

Alfred W. Bowman, Novato, Calif.

Application October 5, 1953, Serial No. 384,084

3 Claims. (Cl. 290—27)

This invention relates to ignition systems for internal combustion engines, specifically to ignition systems of the battery type for use on high-speed, multi-cylinder engines.

It is generally recognized that while battery ignition systems have the advantages of ease in starting and relatively low cost, their igniting efficiency falls off with high speeds of engine operation, particularly in multi-cylinder engines when these engines are operated at higher rates of speed. For this reason multi-cylinder engines designed for high speed operation are frequently supplied with magneto ignitions or with dual ignition systems, both of which expedients lead to both mechanical and electrical complexities and to greatly increased costs.

Among the objects of this invention are to provide a battery ignition system wherein the igniting efficiency and the effective power output either increase or remain substantially constant throughout the higher ranges of engine speeds; to provide an ignition system which is as effective as magneto ignition in high speed operation and permits as ready starting as does a conventional type of battery system; to provide an ignition system which is little if any more expensive than a conventional battery ignition system; to provide an ignition system to which a conventional system can be converted at a relatively small expense; and to provide an ignition system wherein the very factors which have militated against ignition efficiency at high operational speeds are utilized to maintain such efficiency.

Conventional ignition systems comprise an induction coil having a relatively small number of primary turns and relatively many secondary turns. The primary winding is permanently connected in a circuit including a battery and a condenser. The condenser, of course, completely blocks the direct current supplied by the battery as soon as it becomes fully charged. Connected across the condenser, to complete the battery circuit and short-circuit the condenser, is a circuit interrupter or breaker, which comprises a pair of contacts which are normally closed, but which are opened periodically, at the proper epoch of the cycle of each cylinder of the engine, to produce a voltage pulse which causes a spark and ignites the compressed gas in the cylinder. The effectiveness of the spark to cause ignition depends not only on the total energy expended therein but also on the rate at which that energy is expended. The battery which serves to supply the energy of the spark causes current to flow in the primary winding of the induction coil, magnetizing the core. The inductance of the primary winding opposes the flow of battery current so that the current flow starts at a relatively low value as soon as the breaker points close, building up in accordance with an exponential curve which approaches a limiting value in a small fraction of a second. The energy required to start this flow of current is stored in the magnetic field of the core and it is this energy which is expended in the spark and serves to ignite the charge in the engine cylinder. The stored energy is proportional to the square of the current flowing at the instant the breaker-points open. If the circuit is closed long enough for the primary current to approach its limiting value, the energy available for release in the spark approaches a constant.

Since the voltage developed in the secondary coil increases directly with the rate of change of primary flux, it would appear that the most effective ignition would be secured by omitting the condenser in the primary circuit. It has long been known that this is not the case. When the breaker-points open current can flow through the condenser until the latter is fully charged, thus slowing down the rate of change of flux in the core. The presence of the condenser, however, prevents waste of energy by the production of a spark in the primary circuit. The energy stored in the core is transferred to the condenser, which, when fully charged, immediately starts to discharge, causing a current through the primary coil in the direction reverse to that originally supplied by the battery. Maximum voltage is developed in this secondary at the instant of zero current through the coil, when the current is changing direction.

During the interval when the breaker points are open the primary circuit of the coil, including primary winding, condenser, and battery, forms an oscillatory circuit. The oscillatory period of this circuit, considered by itself, is proportional to the square root of the product of the inductance and capacity in the circuit. The secondary circuit is also an oscillatory circuit, for although there is no separate condenser included therein, the distributed capacity in the coil gives it a natural period of its own. The primary and secondary circuits are closely coupled, and when the system is shock-excited by the sudden interruption of the battery circuit oscillations occur at a plurality of frequencies. In general some effort is made to design the system so that the natural periods of the primary and secondary circuits are approximately the same. One of the resultant frequencies is higher and the other lower than the natural period of the separate circuits. There is not necessarily a harmonic relationship between the frequencies, and experiment indicates that in general they both differ when the secondary is open, before the spark occurs, from their value when the secondary is effectively shorted by the spark. The rise-time of the secondary voltage, which determines the instant at which the gap breaks down, depends on the relative frequencies under the open-circuit conditions, while what occurs in the spark itself is determined, at least in part, by the short-circuit frequency relationship.

Both oscillation frequencies are highly damped, and assuming that the circuit conditions are not changed by reclosure of the breaker points, the oscillation will continue until the energy stored in the core is dissipated in the resistance of the spark-gap and the ohmic resistance of the primary and secondary circuits. Long experience has shown, however, that for the primary purpose of igniting the charge in the engine cylinder the more of the energy expended in the first half cycle of the discharge the greater the effectiveness of the spark, energy expended in succeeding oscillations being very largely wasted. This first half cycle has become known as the "condenser spark" or "capacity discharge," and even though the term is not wholly appropriate it has become well enough established in the art so that it may be adhered to.

The reason for this terminology is doubtless the fact that if the condenser is omitted from the primary circuit the conditions on the break are quite different. Although it might appear that the omission of the condenser would provide for a faster break and therefore a higher secondary voltage, it is practically impossible to open the breaker contacts sufficiently rapidly to prevent sparking between them. When the condenser is omitted, once a spark occurs between the breaker-points and the gap is ionized, current continues to flow until the points are far more widely separated than they have to be to cause a complete break when a condenser is present. The energy that goes into the spark between the breaker points is entirely wasted, instead of being stored in the condenser and the rate of change of primary current instead of being greater than with the condenser is actually lower. Once the break does take place there is not sufficient capacity in the circuit to sustain primary oscillations and the secondary oscillates independently at its natural frequency. The first half cycle therefore contains less energy, and the spark is much less effective for ignition purposes.

With the condenser, operation as above described occurs at moderate engine speeds and moderate frequencies of interruption. With multi-cylinder engines a discharge must occur as each cylinder fires. At high speeds, however, the igniting efficiency begins to fall off because the "dwell" of the breaker points becomes so short that the primary current cannot build up to substantially maximum value. There is therefore less energy stored in the core when the break occurs. With the present trend toward multi-cylinder engines, operating at high speeds it has therefore been necessary to use various expedients to attain the desired certainty of ignition. Dual ignition systems, operating alternately, will, of course, double the speed of operation which can be achieved before ignition efficiency begins to fall off, but this involves mechanical complexity and high cost. The primary inductance cannot be decreased without decreasing the amount of energy stored. Raising the battery voltage will increase the energy storage in a given time, so that higher speed operation can be obtained, but this is wasteful at moderate speeds and involves extra weight.

Ordinary practice employs a contact dwell of approximately 60% of the period between breaks. Increasing the dwell to the extent that it can be accomplished with ordinary breaker construction gives some slight advantage in increasing the speed which may be achieved before the ignition efficiency begins to fall off, but although a certain amount of additional certainty of operation can be attained in this manner, as practiced in the past it has not been effective to change the character of the curves illustrative of the operations of the systems but has merely extended them slightly.

All attempts, so far as is known, to improve the operation of ignition systems at high speed by increasing the dwell of the breaker contacts have considered only the advantage gained by giving additional time for the primary current to build up toward its final value. In accordance with the present invention the time of opening and closing the breaker contacts is so coordinated with the periods of oscillation of the induction coil that as the engine reaches the higher speeds at which ignition efficiency would otherwise begin to fall off, the contacts are closed during the first half cycle of the longer period of oscillation of the primary and secondary coils, during the period when the secondary current is decreasing but before it has reversed. This suddenly shorts the condenser and removes the voltage in the primary circuit which at that instant is tending to build up a primary current in the opposite direction to the battery current. Once the primary circuit is closed the spark in the secondary circuit is quenched instantly. The sudden break in the secondary current induces an inductive pulse in the same direction as the battery voltage in the primary, which tends to build up the primary current, with the result that the apparent inductance of the primary circuit is decreased. The average primary current remains constant through a wide range of speeds instead of decreasing with increase of speed and by properly coordinating the circuit constants with the epoch at which the circuit is closed the ignition efficiency can be maintained at a high value up to the highest speeds of which the engine is mechanically capable.

In order to accomplish this effect a special form of distributor and distributor cam are preferably used; the breaker is provided with two sets of points, both pairs being so connected that they will short out the condenser and close the battery circuit. The cam is so formed and the breaker points so positioned with respect thereto that one set closes before the opening movement of the other pair is complete. The effective dwell of the pair of contacts which effects the break is thereby increased, but the increase in the ignition efficiency carries upward to speeds of operation where conventional ignition systems, using only slightly shorter dwell periods, have fallen off to only a small fraction of their maximum value.

All of the above will be more clearly understood by reference to the following description of certain preferred embodiments of the device, taken in connection with the accompanying drawings wherein.

Theoretical basis of the invention will best be understood by reference to the waveforms as illustrated in Figs. 1 to 7 inclusive. The waveforms shown are redrawn from oscillograph tracings and the scales used are arbitrary, different scales having been used in different figures in order to bring out characteristic features of the curves. It is not to be inferred that coils of different manufacture will give corresponding waveforms, but the facts to be emphasized in connection with those shown are to a large degree independent of the particular coil and condenser combination used and the forms shown are typical.

Figure 1:
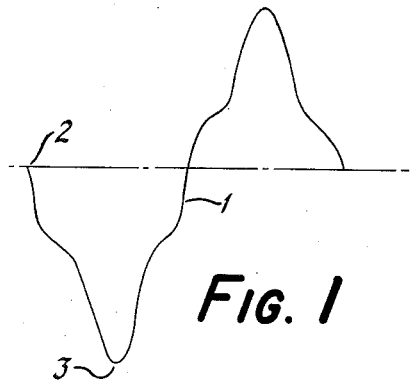
Fig. 1 is an illustration of the primary-winding voltage wave in a typical ignition system, when the secondary circuit is open so that no spark occurs, only one cycle of the lower oscillation frequency being shown.

Fig. 1, curve 1, shows the waveform developed across the condenser of the coil tested when the secondary circuit is open and no spark occurs. An analysis of the waveform developed indicates that the higher frequency oscillation in the coupled circuits is approximately the fifth harmonic of the lower frequency. As is necessarily the case, the two waves start out in phase in the primary circuit and the initial voltage rise when the circuit opens at point 2 of the curve is accordingly steep; the slopes become less as the higher frequency oscillation reaches a maximum and reverses in sign, rising again to a sharp peak at point 3 and then falling, very nearly symmetrically with its rise, to repeat the waveform in opposite phase but at slightly diminished amplitude. Following cycles of the primary wave repeat, with the waveform changing gradually since the harmonic relationship is not exact in this particular coil.

Figure 2:
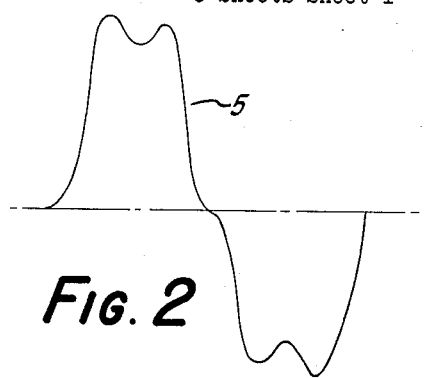
Fig. 2 is an illustration of the voltage wave-form developed in the secondary winding of the same coil under the same conditions.

Curve 5 of Fig. 2 illustrates the corresponding secondary waveform. In the secondary the two components start out in opposite phase. The voltage rise in the secondary is more gradual than in the first becoming steepest where the slope of the primary wave is rising least rapidly. The secondary wave shows two peaks, owing to the fact that the high frequency component is reversed in phase with respect to the low frequency component at the peak of the latter. The same comments as to decreasing amplitude and gradually shifting wave shape which are true of the primary waveform also apply to the secondary waveform.

Figure 4:
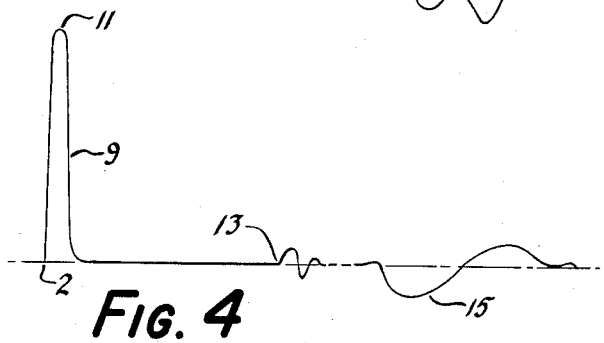
Fig. 4 illustrates the secondary voltage waveform corresponding to the primary wave of Fig. 3.
Figure 3:
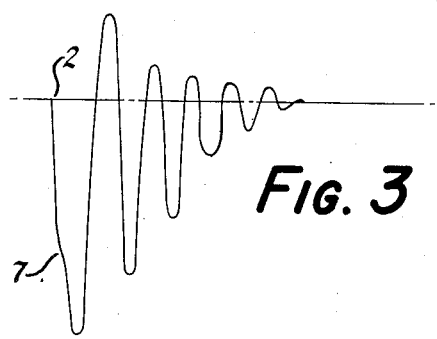
Fig. 3 illustrates the primary voltage wave when a spark occurs in the secondary circuit.

Figs. 3 and 4 show the primary and secondary voltage waves respectively when the secondary circuit is closed through a spark gap. The primary wave, illustrated in curve 7 of Fig. 3 is greatly modified in form, as is the secondary waveform illustrated in curve 9. The secondary voltage rises at the instant of primary break in the same manner as before, up to the time when the spark occurs at point 11 of the curve. It then drops suddenly from a value of several thousand volts to a few volts only, too small to show on a curve illustrative of the peak voltage. The primary wave also starts to rise as before, but its waveform is also profoundly changed by changing secondary conditions when the spark occurs. The amplitude of the higher frequency oscillation is greatly enhanced with respect to the low frequency component and its relative frequency is much greater, being approximately the fifteenth harmonic of the lower frequency. Only one half cycle of the latter is apparent, the energy which was stored in the core being substantially dissipated in the resistance of the spark gap and the primary and secondary circuits. When the spark finally breaks at point 13 of curve 11 a very small oscillation occurs which is barely visible on the oscilloscope and is exaggerated in the curve. This is followed when the breaker points reclose some time later (as indicated by the dotted portion of the curve) by a wave of lower amplitude than that at the break and of a different frequency, since the primary circuit under these circumstances is substantially non-oscillatory. The wave at the make is illustrated by the position 15 of the curve of Fig. 4.

The primary wave at the make does not appear in the curve 7, since the breaker points are closed and no voltage develops in the portion of the circuit where the measurements are taken.

Figure 5:
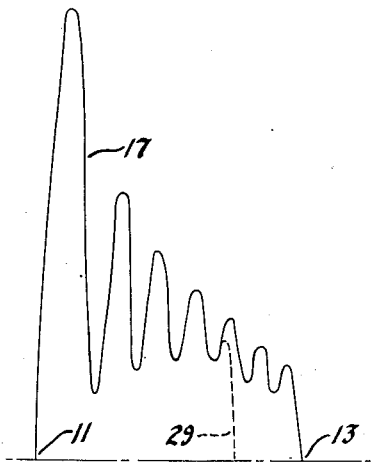
Fig. 5 illustrates the secondary current waveform, two curves being superposed to show the effect of closing the breaker-points at different epochs of the cycle.

The solid curve 17 of Fig. 5 illustrates the current wave in the secondary coil under the same circumstances that produce the voltage wave 9 of Fig. 4. No measurable current flows until the spark gap breaks down at the point 11, corresponding to the point similarly marked in curve 9. The current then rises very rapidly to a high value owing to the superposition of the high and low frequency oscillations, which, after the break occurs, are in phase in the secondary. The higher frequency of oscillations are damped quite rapidly but continue during the half cycle of the lower frequency oscillation. When the engine is running at low speed, either with a conventional system or with a system employing the present invention, the higher frequency oscillation persists until the sum of the voltages at the two frequencies is no longer sufficient to maintain ionization in the gap, at which time the spark breaks and the current plunges suddenly to zero as indicated at the point 13.

Figures 6, 7:
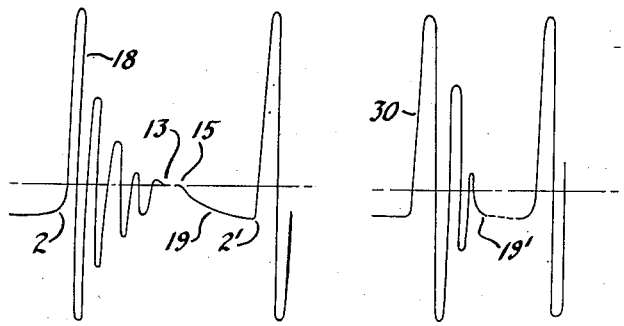
Fig. 6 shows a primary-current waveform corresponding to one of the secondary waveforms of Fig. 5, but drawn to a different time-scale.
Fig. 7 shows the primary waveform corresponding to the other of the waveforms of Fig. 5, the time-scale again being different.

The corresponding primary current is shown in Fig. 6. In the primary the two frequencies established at the instant the spark occurs are out of phase, and owing to the rapid damping of the higher frequency components the presence of the low frequency component is very largely masked. Oscillation beyond the point 13, where the spark breaks, is not visible on the oscilloscope and the current remains substantially at zero until the breaker points close again at point 15. Beyond this point the current rises along the exponential curve as indicated at 19, and at low engine speeds has arrived at substantially a final value at the point indicated by the reference character 2' which corresponds to point 2 as indicated in the other curves for this event, whereupon the same cycle of the events reoccurs.

As has been stated Fig. 6 illustrates at relatively low engine speeds, the course of events when the breaker points do not close until substantial equilibrium has been established in the system and do not open again until the primary current has attained substantially equilibrium value. In Fig. 6 the portion of the curve between points 15 and 2 has been drawn to a smaller time scale than the remainder of the figure in order to show clearly the exponential build-up of current in the primary circuit. It will be clear upon consideration that the length of the portion 19 of the curve depends entirely upon engine speed, whereas the length of the curve between the break at 2 and the point 13 is dependent wholly upon the circuit constants. At high engine speeds point 2 therefore moves nearer and nearer to point 15, reducing the primary current at the instant of break, accordingly.

Energy stored in the core is proportional to the square of the primary current, and it follows that where the speed rises to a point where the primary current has not had an opportunity to build up to its limiting value the energy available for the next spark is reduced. This affects both the ultimate voltage developed in the secondary coil at the break and the current that flows in the secondary after the break occurs. Erratic operation at high speeds can result from one of several causes; the rate of voltage rise, in volts per microsecond, is directly proportional to the peak voltage which would be attained with the secondary circuit open, and reduced ultimate voltage can result in a delayed spark, although this can be compensated for spark advance. If the process is carried far enough sufficient voltage may not develop to cause any spark to occur, in which case the engine of course will fail to fire and will miss. If the spark does occur the current may be so low that it will not ignite the gas in the cylinder and again the engine will miss.

Figure 8:
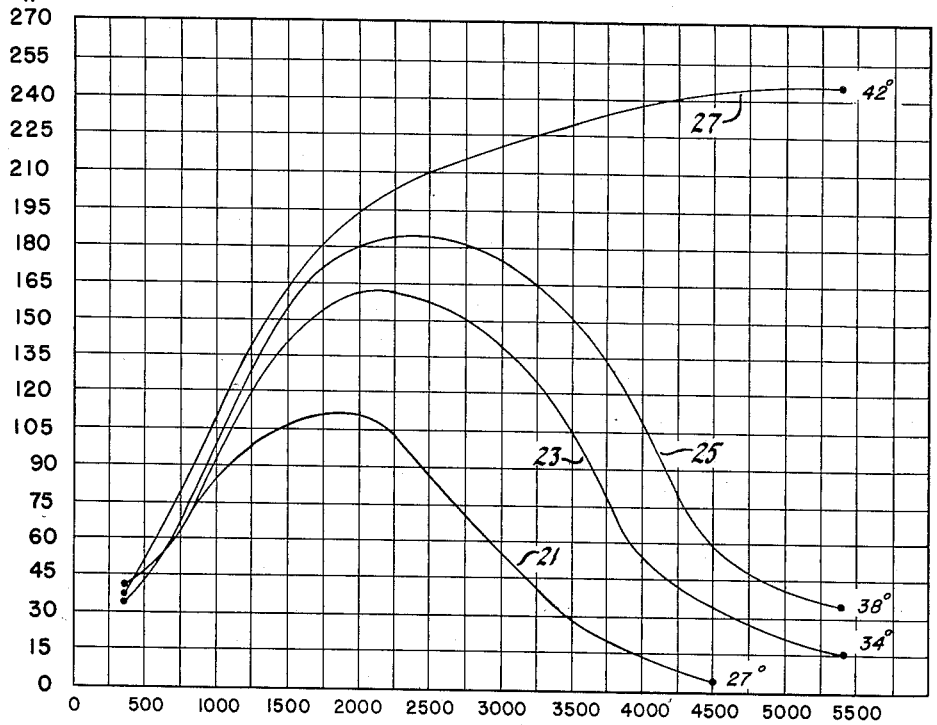
Fig. 8 is a series of graphs showing the energy of the condenser discharge produced from the same induction coil with breakers having different periods of dwell.

The over-all effects that result from these factors are illustrated in the curves of Fig. 8. In these curves the power developed in the secondary circuit is plotted in arbitrary units against 8 cylinder engine speed, with breakers having different percentages of dwell. In these curves, the power available in the circuit increases as the dwell is increased, since it is evident that increasing the dwell moves the point 15 of Fig. 6 nearer point 13 and hence gives the primary current more time to approach its limiting value. In taking the curves of Fig. 8 a meter was used wherein the spark heats a thermosensitive element which actuates a meter movement. The ordinates of the curves are proportional to the integrated effect of the sparks. As might be expected, therefore, the initial portions of all of the curves, where the engine speeds are below 1000 R. P. M., are substantially straight lines rising from the origin. The integrated spark energy, using a standard, commercial-type breaker where the contact dwell is 60% of the cycle between successive breaks is shown in curve 21. In the initial portion of the curve it rises almost linearly, indicating that the primary current has reached nearly its limiting value before the break occurs and the secondary energy is therefore almost directly proportional to the number of sparks. The departure from linearity becomes quite material at engine speeds above 1000 R. P. M., but at a speed of about 2000 R. P. M. the decrease in energy per spark equals the increase in number of sparks per unit time, and above this speed the decrease in energy per spark becomes greater than the increase in number of sparks and the curve turns downward, no readings at all being obtainable above an engine speed of 4500 R. P. M. The curves were taken on a test equipment in order to enable the measurements to be made and the spark energy would have been insufficient to ignite a cylinder charge considerably before sparking ceased.

Curve 23 is similar to curve 21 in form, but in this case the contact dwell was increased to approximately 75% of the cycle. Both the maximum available power and the speed at which the maximum occurs are increased by an amount roughly proportional to the percentage dwell. Within the limits of accuracy of measurement equipment, however, the shape of the curves remains the same and the curve dips downward and ignition efficiency drops in the same manner as with the shorter dwell.

The 75% dwell was the greatest that could be obtained with the standard breaker. Using, however, the same coil and condenser as were employed in taking curves 21 and 23, curve 25 was taken with a breaker of the inventor's design, adjusted to give a dwell of 85% of the ignition cycle. Again the curve shows the same general form, with the increase of speed for maximum energy and the value of the energy maximum being roughly proportional to the percentage of dwell as before. The curve terminates at the maximum speed of which the test equipment was capable. It is interesting to note that the output power at 5400 R. P. M. is almost identical with that at 350 R. P. M. The energy per spark, however, is only about 6½% as great.

Curve 27 indicates the results obtained in accordance with the applicant's invention. In this case the dwell is increased to 93½°, but it will be at once apparent that the shape of the curve is completely changed and that an entirely new phenomenon has been introduced. In accordance with the rule-of-a-thumb relationship established in connection with curves 21, 23, and 25, the curve should show a maximum at approximately 2750 R. P. M. and an approximate scale reading of 205, and then should turn downward as in the cases of the other curves. Instead it continues to rise and is still rising gradually at the limit of the test equipment. The energy per spark has, indeed, fallen off from its maximum to about 41% of the maximum value, but this is to be contrasted with the 6½% with a breaker having only 8% less dwell.

The explanation of the difference between curves 25 and 27 lies, not in the difference in the length of time that the primary circuit is closed, but in the instant of closure as correlated with the duration of the spark. With the eight-cylinder engine for which these curves are drawn, operating at a speed of 3000 R. P. M., and using an interrupter set for the period of dwell used in preparing curve 25, the breaker points are open at each discharge for about 850 microseconds. The duration of the spark is less than half of this period, or about 370 microseconds. The circuit has therefore settled down to a stable condition at the instant the breaker points close.

With the interrupter set to produce the curve 27 and the engine running at 3000 R. P. M., the breaker points close just about at the instant that the spark breaks. When the speed is increased above this value they close before the spark would break were it not for their closure. At engine speeds above this critical value the interval during which they are open is less than one-half cycle of the lower frequency of oscillation of the system, the epoch of closure becoming earlier and earlier as the speed is increased. The effect of the early closure of the breaker points is illustrated in the dotted curve 29 of Fig. 5 and in 31 of Fig. 7. When the gap closes the primary circuit at once becomes non-oscillatory and, as viewed from the secondary, it effectively becomes a short circuit, dropping the secondary voltage to zero and absorbing the remaining energy in the oscillation. The secondary current immediately drops, as is indicated by dotted curve 29, and the spark breaks. In the primary, the condenser is shorted and the battery voltage applied directly in series with the primary coil. The energy remaining in the secondary circuit, however, appears in the primary as an inductive pulse or kick of relatively high value which is in the same direction as the battery voltage. Therefore, instead of the primary rising gradually as is shown by the portion 19 of the curve of Fig. 6, it rises abruptly as is indicated by the portion 19' of the curve 30 of Fig. 7, with the result that nearly as much energy is stored in the core as in the case where the dwell is longer and the primary current has the opportunity to build up exponentially to its full value.

As the speed of the engine increases further the energy in the secondary at the time of the break increases, so that the current still builds up to approximately the same value in each case.

The energy used to reestablish the primary current is, of course, taken from the spark itself and as the curve Fig. 27 shows it is the total energy which tends to level off and become constant and not the energy per spark. This is not, however, as disadvantageous as it might at first appear. It has already been mentioned that the effectiveness of the spark to ignite the cylinder charge depends very largely on the rate of energy dissipation in the first portion of the spark cycle. Since spark energy and hence spark heat varies as the square of the instantaneous current, it will be seen that most of the effective spark energy is liberated in the period corresponding to the first loop of curve 17 and that therefore shortening the spark as indicated by the curve 29 does not materially interfere with its ability to ignite the charge. At the higher speed ranges the amplitude of the first loop is somewhat less, but it is still completely effective for its purpose. Curve 29 follows curve 17 during the first portion of the discharge, up to the point its breaks away from the solid curve, but the two waveforms are plotted to different scales in order to show the time sequence rather than the energy relationship. As curve 27 indicates, however, the loss in energy in the individual sparks is more than compensated by the increase in primary energy stored in the core.

Figure 9:
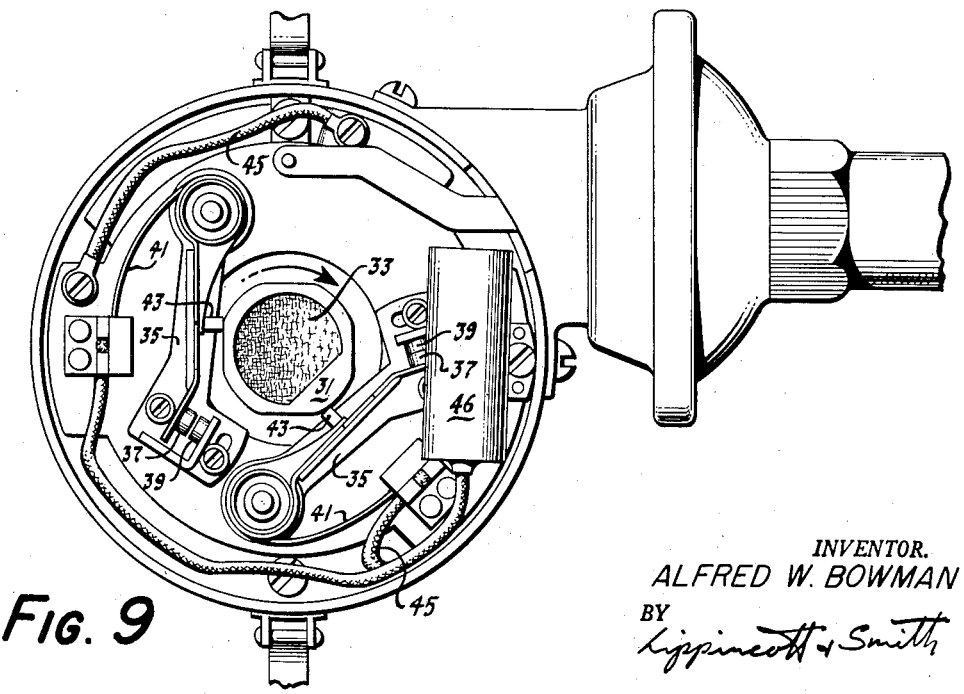
Fig. 9 is a plan view of a breaker adapted for use with the present invention.
Figure 10:
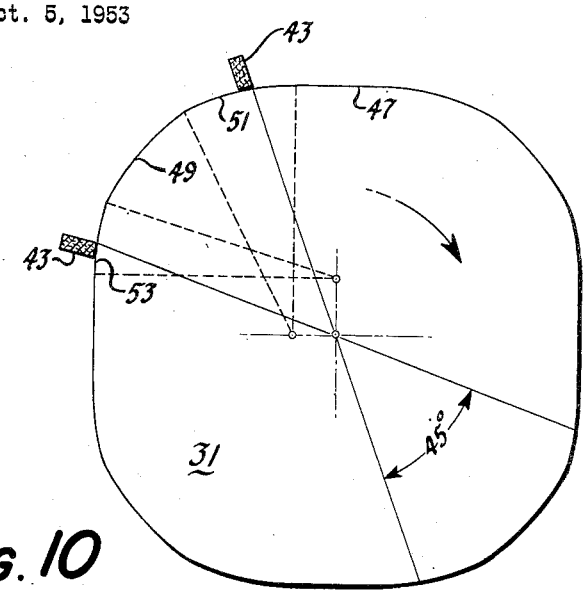
Fig. 10 is a diagrammatic view of the cam employed in the breaker illustrated in Fig. 9.

Figs. 9 and 10 show the construction of a breaker adapted to effect the path of operation that has been discussed from a theoretical viewpoint. Fig. 9 is a plan view of such a breaker as actually constructed while Fig. 10 is an enlarged diagram of the cam employed therein. In this instance the breaker shown is designed for an eight-cylinder engine and a four-lobed cam is used. The cam 2 is mounted on the usual breaker shaft 33. Adjacent to the shaft and spaced at angles of 135° with respect thereto breaker arms 35 are mounted. These arms are of conventional form. Each arm 35 carries a contact point 37, forming a pair with a stationary point 39, which is grounded. Springs 41 tend to keep the pairs of points closed. Fiber blocks 43 bear against the cam, causing the points to open and close as dictated by the cam contour. Leads 45 carry battery current to the breaker arms, which are, as has been indicated, connected in parallel. The usual condenser (46) is connected across the breaker points. Other conventional auxiliary apparatus, such as automatic spark advance, can be incorporated in the same manner as with a conventional breaker, but since such auxiliaries have no direct bearing on the present invention they are not shown.

In the diagram of Fig. 10 the contour of the cam is shown on an enlarged scale. For purposes of illustration the two rubbing blocks 43 are shown in the same quadrant, separated by only 45°, in order to bring out more clearly their relative positions at the times of make and break, since it is obvious that it makes no difference in operation of the device which quadrant is considered since the cam is symmetrical. The breaker arms may be 45° apart or any odd multiple of 45°, their actual position of mounting being a matter merely of mechanical convenience.

The cam may be considered as being formed from an originally square block, whose flat sides 47 merge with concentric circular portions 49 through eccentric arcs 51 and 53. Arc 51 is that at which the break occurs. It merges with the flat side 47 substantially at a tangent, and although its radius is approximately the same as that of eccentric arc 53 its degree of eccentricity is less and the arc is longer. As a result of this formation the movement causing the break is slower than that causing the make, and the points are so adjusted that as a result of the clockwise rotation of the cam whichever point is bearing on the arc 53 closes only 3° of rotation after the points on the other breaker arm open. Experiment has indicated that the difference in actual speed of motion is an aid in securing the nice adjustment required to fix the desired operating cycle, and that it improves operation, probably because it causes the contact resistance to drop more rapidly.

Figure 11:
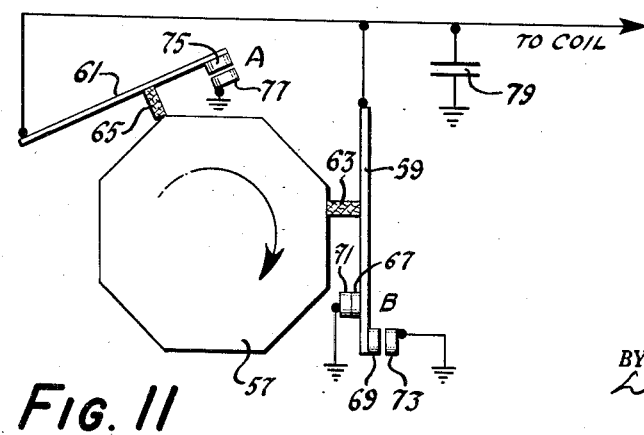
Fig. 11 is a diagram of a different type of breaker and point arrangement.

Fig. 11 illustrates diagrammatically an arrangement using an eight-lobed cam (for an eight-cylinder engine) which is somewhat simpler to construct as far as the cam is concerned and which presents the advantage of enabling the interval during which the battery circuit is opened to be adjusted to a high degree of exactitude. The cam 57 is a substantially regular octagon. As before, two breaker arms are used, arm 59 being the actual operating arm while arm 61 is an auxiliary arm. Each arm carries the usual rubbing block, 63 and 65 respectively. The two arms are connected in parallel. Arm 59 carries two contact points, a "break" contact point 67 and a "make" contact 69. These contacts engage with grounded points 71 and 73 respectively. Arm 61 carries a single point 75 engaging a grounded point 77.

The figure shows the points in the position occupied immediately prior to the break. Contacts 75 and 77 are open; contacts 67 and 71 are closed, completing the battery circuit through the coil and shorting condenser 79. Rotation of the cam, clockwise, beyond the point shown, opens contacts 67—71, and immediately thereafter, with further motion of the contact arm 59, closes points 69 and 73. Either point 69 or 73 may be spring mounted, so that no undue mechanical stresses are set up which would bend the contact arm or do other damage.

While points 69 and 73 are still closed, points 75 and 77 also close so that when the contact arm 59 returns to its original position the circuit is not broken again during the return motion. The increased lever arm between contacts 67 and 69 gives the additional rapidity of motion on the reclosure of the circuit which has been found desirable. The arrangement has the advantage that the contacts 69 and 73 are closed positively by mechanical action and not by spring, and hence there is no danger of chatter and unintentional interruption of the circuit in the "make" action. Contacts 75 and 77 close before contacts 69 and 73 reopen and any rebound which might occur as the contacts on arm 61 close is over before contacts 69 and 73 open and can therefore do no harm.

Figure 12:
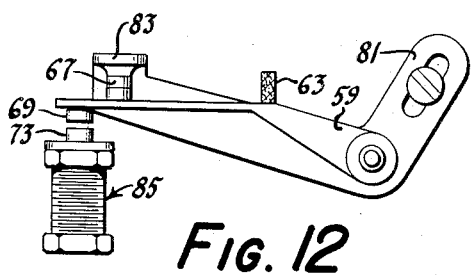
Fig. 12 is a detailed view of a set of breaker points adapted for use in the arrangement of Fig. 11.

Fig. 12 shows the actual construction of contact arm 59. It is pivoted on a generally L-shaped mounting 81, which also carries contact point 67 on an upturned lip 83. In this case the contact point 69 is rigidly mounted on the contact arm, and this is the most desirable arrangement, as it reduces the inertia of the arm to a minimum.

Figure 13:
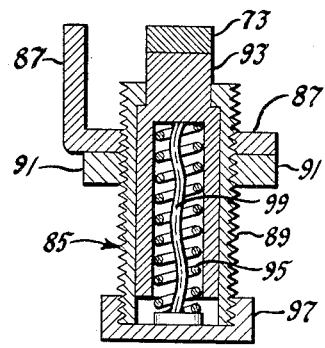
Fig. 13 is a further detail, on a larger scale, indicating the arrangement for adjusting the timing of the points when using the equipment illustrated in Fig. 12.

A detail of the mounting 85 of the second stationary contact 73 is shown at Fig. 13. It is borne by an upturned lip 87 on a mounting plate similar to those used to carry the other stationary elements of the breaker. Into this lip is threaded a hollow screw 89 and its position can be definitely secured by a lock-nut 91. A plunger 93 slides within the screw 89, and carries on its end the contact point 73. The plunger itself is hollow and within it is a spring 95 which bears against a cap 97 on the end of the screw 89, the spring thus urging the plunger forward until its motion is stopped by a co-operating internal shoulder on screw 89 and an external shoulder on plunger 93. Since all of the parts are made of metal, point 73 is naturally grounded, but in order to insure perfect contact a pig-tail 99 can be provided and connected firmly to ground. Adjustment of the contact position and the exact period in which the circuit is open can be adjusted by turning the screw 89 and setting the lock-nut 91.

Electrically the modification of the invention as shown in Figs. 11, 12 and 13 is identical with that of the breaker illustrated in Figs. 9 and 10 if the latter is properly adjusted. Mechanically the device later described has advantages which have already been touched upon, in the certainty of closure as well as ease of adjustment. This latter factor, however, has the additional advantage electrically, in that the duration of circuit opening, or more precisely, the epoch of the oscillation of the system at which the circuit is closed, can be adjusted precisely for a specific coil and condenser so as to effect the desired operation of the circuit and obtain a full advantage of the invention. In the practice of the invention it will be seen that the instant of closure of the circuit is just as important to the timing as is the instant of opening.

The two types of interrupter which have been illustrated are only two of numerous modifications which could be devised. The difference in their construction indicates that the invention is not dependent upon the use of specific apparatus. These examples are therefore not intended to be limiting, all limitations intended being expressed in the following claims.

What is claimed is as follows:

1. A breaker for use in an ignition system for an internal combustion engine comprising a shaft rotatable by said engine, a cam having a plurality of lobes mounted on said shaft, a breaker arm positioned for actuation by said cam, two breaker-points mounted respectively on opposite sides of said breaker arm, fixed breaker-points mounted to contact the arm-mounted breaker-points respectively, the first when said arm is lifted by said cam and the second when said arm is released, an auxiliary arm mounted for actuation by said cam, a breaker-point on said auxiliary arm and a fixed breaker-point mounted to contact the breaker-point on said auxiliary arm, said auxiliary arm being so positioned with respect to said cam as to open said last-mentioned breaker points prior to the opening of contact with said first breaker-point and to close prior to the opening of contact with said second breaker-point, said breaker arm and auxiliary arm being electrically connected in parallel and all of said fixed breaker points being electrically connected in parallel.

2. A breaker as defined in claim 1 wherein said second breaker-point is so mounted on said breaker-arm that its lever-arm is shorter than that of said first breaker-point.

3. A breaker for use in an ignition system for an internal combustion engine comprising a shaft rotatable by said engine, a cam having a plurality of lobes mounted on said shaft, a breaker-arm positioned for actuation by said cam, two breaker-points mounted respectively on opposite sides of said breaker-arm, a pair of fixed breaker-points mounted to contact said arm-mounted breaker-points respectively, the first when said arm is lifted by said cam and the second when it is released, an auxiliary breaker-arm mounted for actuation by said cam, a breaker-point mounted on said auxiliary arm and a fixed-breaker-point mounted to make contact therewith, said auxiliary arm being so positioned with respect to said first mentioned breaker-arm and said cam as to open said last-mentioned breaker points prior to the opening of contact with said first breaker-point and to close prior to the opening of contact with said second breaker-point, said breaker-arms being electrically connected in parallel and all of said fixed breaker-points being electrically connected in parallel whereby contact of any of said arm-mounted breaker-points with a fixed breaker-point will close a circuit to which said breaker-points are connected.

References Cited in the file of this patent

UNITED STATES PATENTS

| | | |
|---|---|---|
| 926,698 | Hubert | June 29, 1909 |
| 1,644,591 | Howard | Oct. 4, 1927 |
| 2,402,543 | Ford et al. | June 25, 1946 |
| 2,674,662 | Hieger | Apr. 6, 1954 |
| 2,711,451 | Beauclair | June 21, 1955 |

FOREIGN PATENTS

| | | |
|---|---|---|
| 732,911 | France | Mar. 10, 1932 |